United States Patent [19]
Verduci et al.

[11] Patent Number: 6,025,564
[45] Date of Patent: Feb. 15, 2000

[54] SINGLE STALK STEERING COLUMN SWITCH

[75] Inventors: Anthony J. Verduci, Livonia; Vladimir Karasik, Walled Lake, both of Mich.

[73] Assignee: Eaton Corporation, Cleveland, Ohio

[21] Appl. No.: 09/309,674

[22] Filed: May 11, 1999

[51] Int. Cl.[7] .................................................. H01H 9/00
[52] U.S. Cl. ................................... 200/61.27; 200/61.54
[58] Field of Search ........................ 200/4, 17 R, 61.27, 200/61.54, 332, 335

[56] References Cited

U.S. PATENT DOCUMENTS

| | | | |
|---|---|---|---|
| 3,511,943 | 5/1970 | Kibler | 200/4 |
| 3,859,489 | 1/1975 | Tomlinson | 200/157 |
| 3,881,076 | 4/1975 | Latka et al. | 200/61.54 |
| 3,940,579 | 2/1976 | Buhl et al. | 200/4 |
| 4,277,658 | 7/1981 | Delp et al. | 200/61.54 |
| 4,336,428 | 6/1982 | Berginski | 200/61.54 |
| 4,387,279 | 6/1983 | Brevick | 200/61.54 |
| 4,408,104 | 10/1983 | Iwata et al. | 200/61.54 |
| 4,423,297 | 12/1983 | Berginski | 200/61.54 |
| 4,427,850 | 1/1984 | Fassio | 200/6 R |
| 4,739,132 | 4/1988 | Erdelitsch et al. | 200/61.54 |
| 4,882,457 | 11/1989 | Erdelitsch et al. | 200/61.54 |
| 4,920,239 | 4/1990 | Buhler et al. | 200/61.54 |
| 5,003,132 | 3/1991 | Lagier | 200/4 |
| 5,049,706 | 9/1991 | DuRocher | 200/61.54 |
| 5,182,423 | 1/1993 | Botz et al. | 200/61.54 |
| 5,453,588 | 9/1995 | DuRocher et al. | 200/61.54 |
| 5,600,100 | 2/1997 | Andrei-Alexandru et al. | 174/261 |
| 5,661,276 | 8/1997 | Shibata | 200/61.54 |
| 5,760,355 | 6/1998 | Glowczewski et al. | 200/61.54 |
| 5,861,594 | 1/1999 | Akimoto et al. | 200/61.54 |

FOREIGN PATENT DOCUMENTS

| | | |
|---|---|---|
| 0 686 102 B1 | 10/1996 | European Pat. Off. ......... B60Q 1/14 |
| 0 690 798 B1 | 10/1996 | European Pat. Off. ......... B60Q 1/14 |
| 0 675 023 B1 | 2/1998 | European Pat. Off. ........ B60R 16/02 |
| 09-134647 | 5/1997 | Japan ............................ H01H 25/04 |

Primary Examiner—Michael Friedhofer
Attorney, Agent, or Firm—Daniel S. Kalka

[57] ABSTRACT

A multi-function single lever switch (10) with an axial type contact system design. A first radially moveable contact ring (20) is interposed on a lever base (12) between a stationary contact ring (24). The stationary contact ring (24) includes a projecting portion (28) adapted to receive a second radially moveable contact ring (30) thereon and is surrounded by a cover (34). Cover (34) has an actuatable push button (36) assembly at one end. A plurality of axially disposed stationary electrical blade contacts (16, 26) on the lever base (12) and stationary contact ring (24) interconnect with electrical contacts (22, 32) on the first and second radially moveable contact rings (20, 30) as well as an electrical contact (40) on the push button (36) assembly.

25 Claims, 2 Drawing Sheets

SINGLE STALK STEERING COLUMN SWITCH

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention relates in general to a steering column stalk switch, and more specifically to a steering column mounted stalk or lever switch controlling various vehicle operating circuits and/or devices.

2. Description of the Related Art

Steering column lever switches or stalk switches are well known in the vehicle industry. These devices are typically used to control turn signals, windshield wipers, windshield washers, cruise control, or any variety or combination of devices.

Typically, the lever switch includes a rotatable operating knob which can be turned between an off position and a variety of actuating positions, for example, for various speeds of a windshield wiper, or for intermittent operation.

The handle may also include an outer sleeve that rotates for actuating the windshield washer system. U.S. Pat. No. 4,387,279 describes a multi-function lever switch for a steering column.

Other examples of lever switches may be found in the following patents: U.S. Pat. Nos. 3,881,076; 5,049,706; 4,427,850; 4,408,104; 5,661,276; and 5,453,588.

Heretofore, the prior art single lever switches use a so-called radial type contact system design that employs either a horizontally located printed circuit board (PCB) or an insert molded electrical contact part.

A need still exists for a full function single lever switch based on two independent axial contact systems to implement multi-functions, such as a front and rear wipe/wash function. Preferably, such a switch would consist of two rotating contact rings with stationary blade contacts. The axial type contact design offers a more robust geometry with less position deviations. It requires less parts compared with the conventional radial type contact design and requires less assembly operations.

BRIEF SUMMARY OF THE INVENTION

The present invention is directed to solving the aforementioned problems as well as others by providing a single multi-function lever switch with an axial type contact design. In the preferred embodiment, a single lever switch in accordance with the present invention employs two independent contact systems located axially to implement, for example, a front and rear wipe/wash system. A lever base includes a plurality of axially disposed electrical contacts at one end and receives a first moveable contact ring thereon. The radially moveable contact ring includes a plurality of electrical contacts therein which are in electrical communication with the plurality of axially disposed electrical contacts on the lever base. A stationary contact ring is then positioned at the end of the lever base so as to interpose the first moveable contact ring between the stationary contact ring and the lever base. The stationary contact ring includes a plurality of axially disposed electrical contacts with at least one of the axially disposed electrical contacts being in communication with at least one of the electrical contacts on the first moveable contact ring. The stationary contact ring includes a projecting portion which receives a second moveable contact ring positioned thereover. The second radially moveable contact ring includes a plurality of electrical contacts therein in electrical communication with the plurality of axially disposed electrical contacts upon the stationary contact ring. A cover is positioned on a distal end of the projecting portion of the stationary contact ring. The cover includes a resiliently actuatable button with an electrical contact. The button with the electrical contact communicates with at least one of the plurality of axially disposed electrical contacts in the stationary contact ring. Preferably, the present invention includes a first and second cam ring positioned inside the first and second moveable contact rings for providing selected engagements of the plurality of electrical contacts for achievement of desired purposes for electrical communication with a variety of electrical circuits and/or devices.

An object of the present invention is to provide a multi-function single lever switch for a vehicle.

Another object of the present invention is to provide a multi-function single lever switch using two independent contact systems employing an axial type contact design.

Another object of the present invention is to provide a single lever switch that employs less parts compared with a conventional lever design.

Another object of the present invention is to provide a single lever switch that requires less assembly operations.

Still another object of the present invention is to provide a multi-function single lever switch that employs two rotating contact rings with stationary blade contacts. Each contact ring includes a set of cams located inside for selective engagement of the electrical contacts.

Still a further object of the present invention is to provide a multi-function single lever switch which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is described and illustrated.

DETAILED DESCRIPTION OF THE INVENTION

Figure 1:
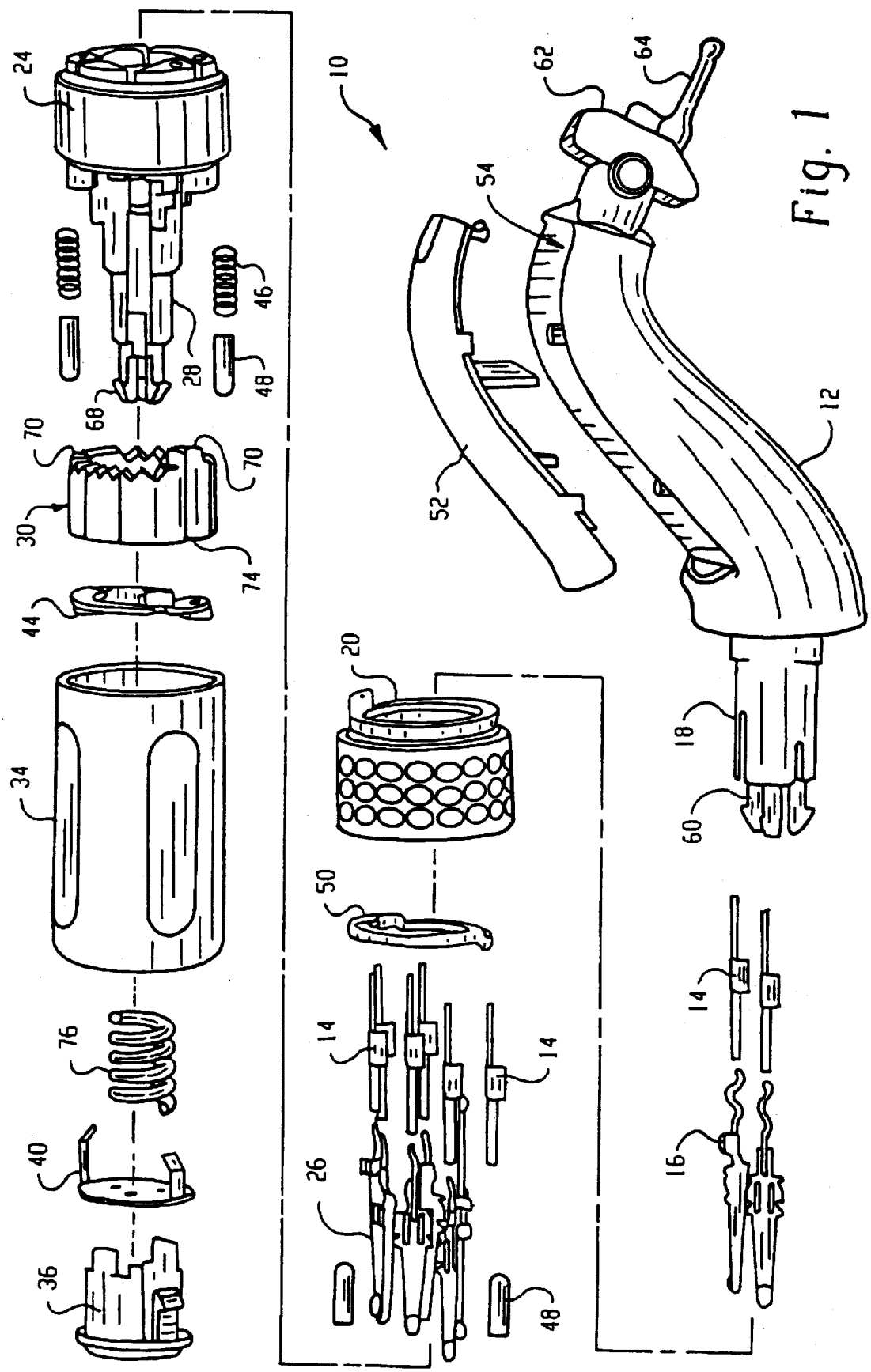
FIG. 1 is an exploded view of the multi-function lever switch in accordance with the present invention.

Referring to the figures, where like numerals designate like or similar features throughout the several views, and first in particular to FIG. 1, there is shown an exploded view of a lever switch generally designated 10 in accordance with the present invention. Lever switch 10 is a multi-function lever switch constructed for connection in a vehicle steering column (not shown) and is operative to control the operation of various operating devices or circuits found in vehicles, such as a vehicle windshield wiper and washer control for the front window and/or the rear window, turn signals, vehicle headlights, vehicle headlight switching between low and high beam, or any other desired function typically found in a vehicle. The lever switch 10 includes a lever base 12 which is preferably generally tubular in construction and has a connecting arm 62 with a switch finger 64 for mounting in a steering column (not shown). The other end 18 of lever base 12 has also a preferable tubular construction with a slightly reduced diameter from a main portion of the lever base 12. Lever base 12 further preferably terminates with a plurality of engaging members 60 designed to snap and lock within a mating receptacle. Alternatively, engaging members 60 may be arranged in a spaced hexagonal arrangement with each side of the hexagon being separated by an axially extending slot to merely slide and snap lock into a mating receptacle. A plurality of axially disposed electrical contacts 16 are positioned circumferentially on the reduced end 18 of lever base 12. Preferably electrical contacts 16 are stationary blade contacts and secured to lever base 12 with a mechanical snap or press fit engagement and are constructed to receive electric connectors 14 which are connected to wires 15 either by way of crimping, soldering, or the like. In the preferred embodiment, lever base 12 includes a compartment 54 which basically is a hollow space in the interior of lever base 12 and is releasably sealed with a lever base closeout 52. Compartment 54 provides storage for the wires 15 employed with the lever switch 10 of the present invention.

The first moveable contact ring 20 with the preferable integral cam ring 50 inside has an internal bore that corresponds to the size of the reduced end 18 of lever base 12. The outer surface of ring 20 is preferably dimpled as shown in FIG. 1. A plurality of electrical contacts 22 are provided in an interior surface of moveable contact ring 20 at a distance and spacing to allow electrical communication with axially disposed electrical contacts 16 and axially disposed electrical contacts 26. Electrical contacts 26 are spaced circumferentially about a projecting portion 28 of stationary contact ring 24. As shown in FIG. 1, preferably electrical contacts 26 are stationary blade contacts that simply slide through corresponding apertures in stationary contact ring 24 in a sleeve or press fit arrangement that allows a portion of the blade contact to be disposed about the periphery of projecting portion 28. At least one of the electrical contacts 26 extends inwardly towards the first moveable contact ring to electrically communicate with the first moveable contact ring 20. Stationary contact ring 24 is constructed to be received on end 18 of lever base 12 with the first moveable contact ring 20 interposed therebetween. Engaging members 60 snap lock the stationary ring 24 onto end 18 in a manner that allows contact ring 20 to radially move on end 18. Plungers 48 are optionally provided to facilitate attachment of an external cam ring when used and to interconnect the pieces. Projection portion 28 of stationary contact ring 24 terminates in at least one locking tab 68 to snap fit within button 36, and still allow button 36 to slidably move thereon.

The plurality of electrical contacts 22 in the interior of contact ring 20 are preferably plated on a die cast contact surface about a circumferential portion thereof for a desired electrical communication with one or more of the electrical contacts 16, 26. Vertically arranging contacts 16, 26 or contacts 22, 32 allow a variety of desired operator controllable settings or positions.

A second moveable contact ring 30 with preferably a cam inside and a plurality of electrical contacts 32 on an inner surface thereof similar to contacts 22 has an internal diameter corresponding to the projecting portion 28 of stationary contact ring 24. A plurality of springs 46 and plungers 48 resiliently bias contact ring 30 away from stationary contact ring 24. In an alternate embodiment, the cam ring 44 may be external to contact ring 30 rather than situated on the inside. Preferably, an inward edge of contact ring 30 contains a plurality of teeth 70 for a radial ratcheting action that provides precise settings and positional control. A stopping protrusion 72 limits the rotational movement of contact ring 30. Contact ring 30 has an outer diameter that allows the contact ring 30 to fit within the inner diameter of a cover 34. Contact ring 30 preferably includes a groove 74 constructed to engage and mesh with a raised rib (not shown) inside cover 34. As cover 34 is rotated, this causes rotation of second moveable contact ring 30 therewith. Cover 34 is preferably cylindrical and includes an opening with an edge to accommodate button 36 therein at its distal end. Button 36 is resiliently biased with spring 76 against projecting portion 28 of stationary contact ring 24. Projecting portion 28 preferably has a stepped down diameter to provide for a supporting surface for spring 76. Spring 76 has a diameter corresponding to one of the reduced diameters of the projecting portion. An electrical contact 40 which may be incorporated within button 36 or be an external assembly as shown in FIG. 1 provides electrical communication with at least one of the plurality of electrical contacts on stationary ring 24. Spring 76 biases the electrical contact 40 away from an electrical contact on the second moveable contact ring 30.

Lever switch 10 is a full function single lever switch based on two independent contact systems located axially perpendicularly to the lever centerline (to preferably implement front and rear wipe/wash functions). The lever switch preferably consists of two rotating contact rings and stationary blade contacts. Each of the contact rings preferably has a set of cams located inside in a set order to have engagements with the corresponding stationary contacts to provide a set of binary codes or electrical signals for the electronic module or vehicle processor.

The single lever switch in accordance with the present invention employs an axial type contact system design that is more robust and not sensitive to the axial part geometry, and/or position deviations encountered with the prior art radial type contact system design. As a result, the lever switch of the present invention provides several advantages including but not limited to a contact force, deflection and stress relaxation that are more stable. The present invention requires approximately 20% less parts compared with the conventional lever design. It also provides an advantage of approximately 30% less assembly operations. The design of the lever switch in accordance with the present invention allows the use of the assembled wires with preferably crimped terminals. This can be a bottle neck for other lever switch assemblies. The design of the present invention provides for an assembly process that may be automated.

Still another advantage of the present invention is that it allows the use of common parts such as electrical blade contacts as a result of the axial type contact system. The simple assembly of the lever switch according to the present invention allows the checking or testing of parts for fit, form, function, at any time during the assembly process. The design of the lever switch in accordance with the present invention further allows a decrease in the outside lever diameter.

In accordance with the present invention, the lever switch provides an axial loaded contact system. Preferably, the common electrical blade contacts are employed for front and/or rear wiper/wash functions. The lever switch allows the use of a common ground contact between the front and rear contact systems. During assembly, an assembled wire harness can be located through openings inside the lever core or base. The lever switch allows for a slide mechanism for the wash contact function. The first and/or second moveable contact rings may be a die cast contact ring with an integral cam ring with plating including plated tabs connecting portions of an electrical band. Each contact ring includes a set of cams located inside in a set order to have engagements with corresponding stationary electrical contacts to provide a set of electrical signals or binary codes for electronic modules or vehicle processors. The rotating contact cam rings are preferably included as part of the front and/or rear plastic contact rings. The design of the lever switch in accordance with the present invention allows for self locking mechanisms between the parts. Common springs and plungers are employed from front/rear detent structures. The lever switch is preferably constructed from a plastic material except for the electrical contacts and springs. The plastic material such as a reinforced nylon material insulates the contacts from each other. A raised portion on an electrical stationary blade contact provides an electrical connection with the electrical contact in the first and/or second moveable contact rings.

Figure 2:
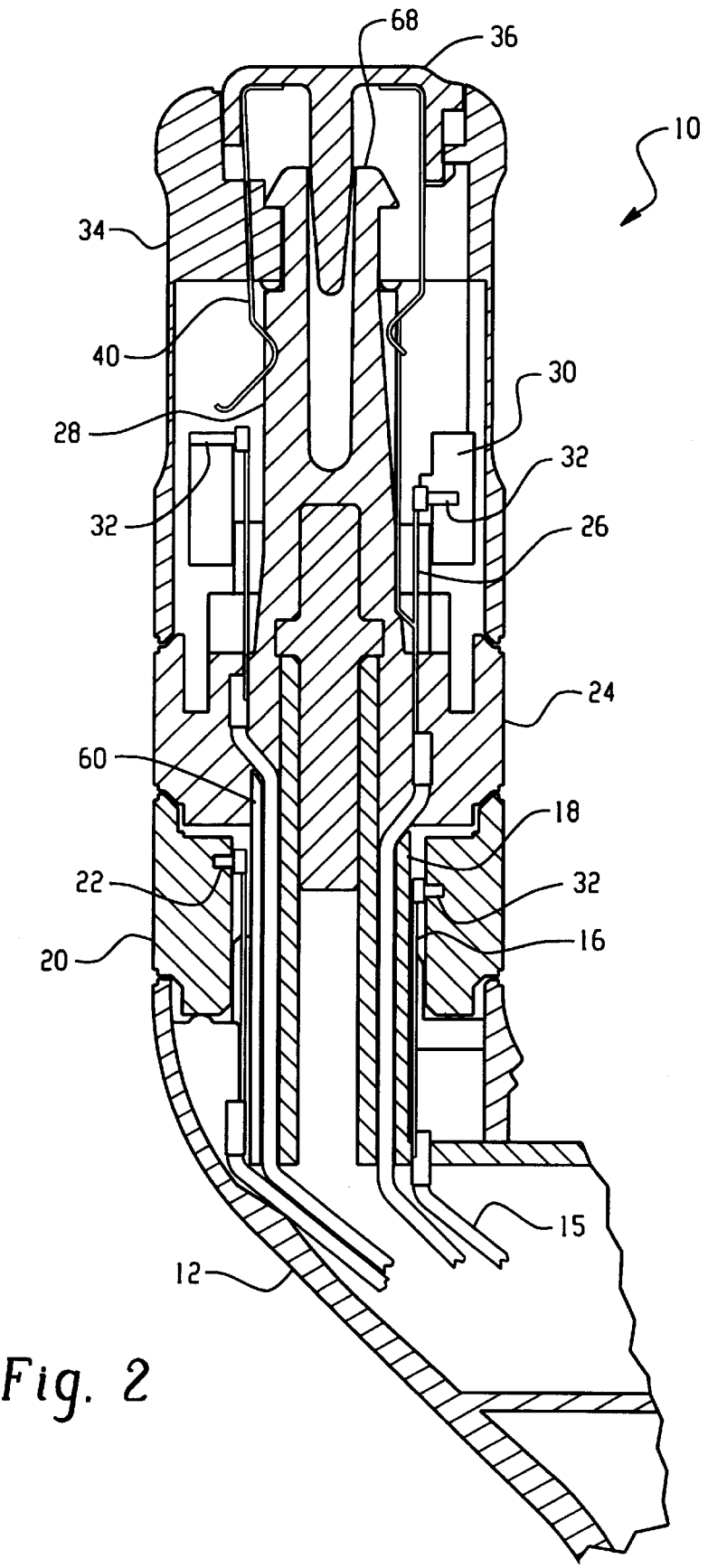
FIG. 2 is a sectional view of a portion of the present invention.

Still another advantage of the present invention is that it requires no additional parts for wires strain relief. The more secure design of the instant invention inhibits dust from entering inside the lever as easily as the prior art. FIG. 2 shows a portion of the assembled lever switch and the secure design.

While specific embodiments of the invention have been shown and described in detail to illustrate the application of the principles of the invention, it will be understood that the invention may be embodied otherwise without departing from such principles.

We claim:

1. A stalk switch, comprising:
   a lever base constructed for installation on a vehicle steering column, said lever base having a plurality of axially disposed electrical contacts at one end thereof;
   a first moveable contact ring positioned over the end of said lever base having said plurality of axially disposed electrical contacts, said first moveable contact ring being radially moveable thereon and having a plurality of electrical contacts therein in electrical communication with said plurality of axially disposed electrical contacts on said lever base;
   a stationary contact ring positioned at the end of said lever base adjacent said first moveable contact ring, said stationary contact ring having a plurality of axially disposed electrical contacts with at least one of said axially disposed electrical contacts being constructed to connect with at least one of said electrical contacts on said first moveable contact ring, said stationary contact ring having a projecting portion;
   a second moveable contact ring positioned over said projecting portion of said stationary contact ring, said second moveable contact ring being radially moveable thereon and having a plurality of electrical contacts therein in electrical communication with said plurality of axially disposed electrical contacts on said stationary contact ring; and
   a cover having a button at a distal end with an electrical contact, said button being in electrical communication with at least one of said plurality of axially disposed electrical contacts in said stationary contact ring, said cover receiving said second moveable contact ring therein and being disposed over said projecting portion of said stationary contact ring.

2. A stalk switch as recited in claim 1, wherein said lever base comprises a hollow portion defining a compartment for receiving wires therein, and a lever base closeout for accessing and covering the compartment.

3. A stalk switch as recited in claim 2, further comprising a first and second cam ring, said first cam ring being located inside said first moveable contact ring, said second cam ring being located inside said second moveable contact ring for providing selected engagements of said plurality of electrical contacts.

4. A stalk switch as recited in claim 3, wherein said plurality of axially disposed electrical contacts in said stationary contact ring comprise electrical blade contacts circumferentially spaced on said projecting portion of said stationary contact ring.

5. A stalk switch as recited in claim 4, wherein said plurality of axially disposed electrical contacts in said lever base comprise electrical blade contacts.

6. A stalk switch as recited in claim 5, wherein said lever base comprises substantially an S-shape.

7. A stalk switch as recited in claim 6, wherein said end of said lever base having said plurality of axially disposed electrical contacts has a diameter less than a diameter of a remaining portion of said lever base.

8. A stalk switch as recited in claim 7, wherein said end of said lever base having said plurality of axially disposed electrical contacts comprises a plurality of engaging members, said engaging members being constructed for engagement with said stationary contact ring.

9. A stalk switch as recited in claim 8, wherein the other end of said lever base comprises a connecting arm for mounting in the steering column.

10. A stalk switch as recited in claim 8, wherein said second moveable contact ring comprises a plurality of teeth on an edge directed towards said stationary contact ring.

11. A stalk switch as recited in claim 10, further comprising resilient means for biasing aid second moveable contact ring from said stationary contact ring.

12. A stalk switch as recited in claim 11, wherein said resilient biasing means comprises a plurality of springs spaced around a periphery of said stationary contact ring.

13. A stalk switch as recited in claim 12, further comprising a compression spring situated within said cover for biasing the electrical contact on said button with said at least one axially disposed electrical contact.

14. A stalk switch as recited in claim 1, wherein said plurality of electrical contacts for said first and second moveable contact rings are situated on cam rings located within said first and second moveable contact rings.

15. A stalk switch assembly, comprising:
    a lever base for use with a steering column, said lever base having one end with a plurality of electrical contacts axially disposed thereon, and an opposite end with a connecting arm constructed for connection with the steering column, the end with the plurality of electrical contacts having a reduced size and diameter, and including at least one engagement member;
    a first contact ring radially moveable situated on the reduced sized end of said lever base, said first contact ring having a set of cams located inside with a plurality of electrical contacts therein for selective engagement with said plurality of electrical contacts on the lever base;

a stationary contact ring positioned on the at least one engagement member of said lever base with said first contact ring being interposed between said stationary contact ring and a main portion of said lever base, said stationary contact ring having a plurality of electrical contacts axially disposed on a projecting portion of said stationary contact ring, at least one of said plurality of electrical contacts being in electrical communication with at least one of said electrical contacts in said first contact ring, said projecting portion of said stationary contact ring having at least one locking tab at an end thereof;

a second contact ring radially moveable situated on said projecting portion of said stationary contact ring, said second contact ring having a set of cams inside in an arrangement to correspond electrical contacts therein with at least one of the electrical contacts on said projecting portion of said stationary contact ring; and a cover surrounding said second contact ring and said projecting portion of said stationary contact ring, said cover having a button at one end with an electrical contact therein for communicating with at least one of said plurality of electrical contacts on said projection portion of said stationary contact ring, said cover engaging said second contact ring for radial movement therewith, said cover further having means for biasing said button from electrical engagement.

16. A stalk switch as recited in claim 15, wherein said lever base comprises a compartment in an interior portion thereof for receiving wires.

17. A stalk switch as recited in claim 16, wherein said plurality of electrical contacts axially disposed on a projecting portion of said stationary contact ring comprise electrical blade contacts circumferentially spaced around said projecting portion.

18. A stalk switch as recited in claim 17, wherein said electrical blade contacts are disposed at varying axial distances on said projecting portion.

19. A stalk switch as recited in claim 18, wherein said set of cams inside said first and second contact rings are positioned to electrically communicate with corresponding electrical contacts on said stationary ring for providing independent signals.

20. A method for assembling a lever switch, comprising the steps of:

providing a lever base, the lever base having a connecting arm at a first end for connection to a steering column and a projecting portion at a second end;

positioning a plurality of electrical contacts axially on the projecting portion of the lever base;

providing a first moveable contact ring with a plurality of electrical contacts therein;

positioning the first moveable contact ring on the projecting portion of the lever base in a manner that the first moveable contact ring is radially moveable thereon and the electrical contacts therein engage the axially positioned electrical contacts on the lever base when the first moveable contact ring is rotated;

providing a stationary contact ring with a projecting portion;

disposing axially thereon about a circumference of the projecting portion of the stationary contact ring a plurality of electrical contacts, at least one of the electrical contacts being in communication with one of the electrical contacts on the first moveable contact ring;

positioning the stationary contact ring on the projecting portion of the lever base with the first moveable contact ring situated between the stationary contact ring and the lever base;

providing a second moveable contact ring with a plurality of electrical contacts therein;

positioning the second moveable contact ring on the projecting portion of the stationary contact ring in a manner that the second moveable contact ring is radially moveable thereon and in electrical communication with the plurality of electrical contacts thereon;

providing a cover with an actuatable push button; and positioning the cover over the second moveable contact ring on to the projecting portion of the stationary contact ring so that an end of the projecting portion is slidably received within the push button to allow electrical contact, the cover engaging the second moveable contact for rotational movement therewith.

21. A method as recited in claim 20, further comprising the steps of connecting wires to the plurality of electrical contacts on the lever base and the stationary contact ring; and running the wires through an interior compartment of the lever base.

22. A method as recited in claim 21, wherein the step of connecting comprises the step of crimping a wire to an electrical contact.

23. A method as recited in claim 20, wherein the disposing step comprises the step of axially arranging at set distances each of the plurality of electrical contacts.

24. A method as recited in claim 20, wherein the steps of providing the first and second moveable contact rings comprise the step of providing a die cast contact ring with plating for each of the first and second moveable contact rings.

25. A method as recited in claim 24, further comprising the step of situating the die cast contact ring in each of the first and second moveable contact rings.

* * * * *